United States Patent
Oyanagi et al.

(10) Patent No.: US 12,057,152 B2
(45) Date of Patent: Aug. 6, 2024

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventors: Noriko Oyanagi, Minami-ashigara (JP); Wataru Kikuchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 17/186,470

(22) Filed: Feb. 26, 2021

(65) Prior Publication Data

US 2021/0280213 A1   Sep. 9, 2021

(30) Foreign Application Priority Data

Feb. 28, 2020   (JP) .................... 2020-034245

(51) Int. Cl.
*G11B 5/008*   (2006.01)
*C10M 105/54*   (2006.01)
*C10M 107/38*   (2006.01)
*C10M 171/00*   (2006.01)
*G11B 5/706*   (2006.01)
*G11B 5/73*   (2006.01)
*G11B 5/735*   (2006.01)

(52) U.S. Cl.
CPC ...... *G11B 5/73935* (2019.05); *G11B 5/00813* (2013.01); *G11B 5/70678* (2013.01); *G11B 5/7358* (2019.05)

(58) Field of Classification Search
CPC ............ G11B 5/00813; G11B 5/70678; G11B 5/7358; G11B 5/73935; G11B 5/7253; G11B 5/7356; C10M 105/54; C10M 107/38; C10M 2211/04; C10M 2211/0406; C10M 2211/06; C10M 2211/063; C10N 2020/01
See application file for complete search history.

(56) References Cited

U.S. PATENT DOCUMENTS

| | | | | |
|---|---|---|---|---|
| 5,571,595 A | * | 11/1996 | Chiba | G11B 5/73937 428/473.5 |
| 2002/0164504 A1 | * | 11/2002 | Masaki | G11B 5/70678 |
| 2003/0199621 A1 | * | 10/2003 | Jariwala | D06M 13/438 524/288 |
| 2009/0168265 A1 | * | 7/2009 | Harasawa | G11B 5/735 360/324 |
| 2017/0316799 A1 | * | 11/2017 | Shimizu | G11B 5/70 |
| 2018/0025748 A1 | * | 1/2018 | Tano | C10M 105/54 508/582 |

FOREIGN PATENT DOCUMENTS

JP   H10-003648 A   1/1998

OTHER PUBLICATIONS

English Machine Translation: Sato et al. (JP 2006-202388) (Year: 2006).*

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a non-magnetic support, and a magnetic layer including a ferromagnetic powder. An anisotropic magnetic field Hk is 12 kOe or more, a center line average roughness Ra of the surface of the magnetic recording medium on the magnetic layer side is 1.2 nm or less, and a ratio θr of a contact angle θ2 with respect to 1-bromonaphthalene, measured on a surface on the magnetic layer side after a 1,1,1,2,2,3,4,5,5,5-decafluoropentane immersion, to a contact angle θ1 with respect to 1-bromonaphthalene, measured on the surface on the magnetic layer side before the 1,1,1,2,2,3,4,5,5,5-decafluoropentane immersion is 0.95 or less.

17 Claims, No Drawings

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application claims priority under 35 U.S.C 119 to Japanese Patent Application No. 202034245 filed on Feb. 28, 2020. The above application is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

Magnetic recording media have been widely used as recording media for recording various pieces of data (see, for example, JP1998-003648A (JP-H10-003648A)).

SUMMARY OF THE INVENTION

It is desired that a magnetic recording medium exhibits excellent electromagnetic conversion characteristics. Meanwhile, from a viewpoint of improving the recording density, it is desirable that an anisotropic magnetic field Hk of the magnetic recording medium is high. However, as a magnetic recording medium has a higher anisotropic magnetic field Hk, a magnetic layer tends to be less likely to be magnetized, and as a result, the electromagnetic conversion characteristics tend to be deteriorated.

Therefore, one aspect of the invention is to provide a magnetic recording medium having a high anisotropic magnetic field Hk and capable of exhibiting excellent electromagnetic conversion characteristics.

According to one aspect of the invention, there is provided a magnetic recording medium comprising:

a non-magnetic support; and a magnetic layer including a ferromagnetic powder, in which an anisotropic magnetic field Hk is 12 kOe or more, a center line average roughness Ra of a surface of the magnetic recording medium on a magnetic layer side is 1.2 nm or less, and a ratio $\theta r$ of a contact angle $\theta 2$ with respect to 1-bromonaphthalene, measured on a surface on the magnetic layer side after a 1,1,1,2,2,3,4,5,5,5-decafluoropentane immersion, to a contact angle $\theta 1$ with respect to 1-bromonaphthalene, measured on the surface on the magnetic layer side before the 1,1,1,2,2,3,4,5,5,5-decafluoropentane immersion is 0.95 or less.

Hereinafter, the contact angle with respect to 1-bromonaphthalene is also be referred to as a "1-bromonaphthalene contact angle".

In one embodiment, the magnetic recording medium may contain a fluorine-containing compound in a portion of the magnetic layer side on the non-magnetic support.

In one embodiment, the fluorine-containing compound may be a fluorine-containing compound represented by Formula 1.

Formula 1

(In Formula 1, Rf represents a fluorine-containing hydrocarbon group, L represents a divalent linking group, R represents a hydrogen atom, an alkyl group, or a fluorine-containing hydrocarbon group, and n is 0 or 1.)

In one embodiment, in Formula 1, Rf may represent a perfluoroalkyl group.

In one embodiment, R may represent a hydrogen atom, an alkyl group, or a perfluoroalkyl group.

In one embodiment, in Formula 1, n may be 1 and the divalent linking group represented by L may be an alkylene group, an ester group, or a divalent linking group consisting of a combination of the alkylene group and the ester group.

In one embodiment, the ratio $\theta r$ may be 0.50 to 0.95.

In one embodiment, the Ra may be 0.1 nm to 1.2 nm.

In one embodiment, the Hk may be 12 kOe to 50 kOe.

In one embodiment, the ferromagnetic powder may be a hexagonal ferrite powder.

In one embodiment, the hexagonal ferrite powder may be a hexagonal strontium ferrite powder.

In one embodiment, the hexagonal ferrite powder may be a hexagonal barium ferrite powder.

In one embodiment, the ferromagnetic powder may be an ε-iron oxide powder.

In one embodiment, the magnetic recording medium may further include a non-magnetic layer including a non-magnetic powder between the non-magnetic support and the magnetic layer.

In one embodiment, the magnetic recording medium may comprise a back coating layer including a non-magnetic powder on a surface of the non-magnetic support opposite to the surface on which the magnetic layer is provided.

In one embodiment, the magnetic recording medium may be a magnetic tape.

According to another aspect of the invention, there is provided a magnetic tape cartridge including the magnetic tape described above.

According to still another aspect of the invention, there is provided a magnetic recording and reproducing device including the magnetic recording medium described above.

According to one aspect of the invention, it is possible to provide a magnetic recording medium having a high anisotropic magnetic field Hk and capable of exhibiting excellent electromagnetic conversion characteristics. In addition, according to one aspect of the invention, it is possible to provide a magnetic tape cartridge and a magnetic recording and reproducing device including the magnetic recording medium.

DESCRIPTION OF THE PREFERRED EMBODIMENTS

An embodiment of the invention relates to a magnetic recording medium including a non-magnetic support, and a magnetic layer including a ferromagnetic powder. An anisotropic magnetic field Hk of the magnetic recording medium is 12 kOe or more, a center line average roughness Ra of the surface of the magnetic recording medium on the magnetic layer side is 1.2 nm or less, and a ratio $\theta r$ of a contact angle θ2 with respect to 1-bromonaphthalene, measured on a surface on the magnetic layer side after a 1,1,1,2,2,3,4,5,5,5-decafluoropentane immersion, to a contact angle θ1 with respect to 1-bromonaphthalene, measured on the surface on the magnetic layer side before the 1,1,1,2,2,3,4,5,5,5-decafluoropentane immersion is 0.95 or less.

The "anisotropic magnetic field Hk" of the magnetic recording medium in the invention and the specification refers to a magnetic field in which magnetization is saturated, in a case where a magnetic field is applied in a direction of the magnetization hard axis of the magnetic layer. The anisotropic magnetic field Hk can be measured by using a well-known measurement device capable of measuring magnetic properties such as a vibrating sample magnetometer. A sample piece that can be introduced into the measurement device is cut out from the magnetic recording medium to be measured, and the Hk is measured for the sample piece at a temperature of 23° C. By setting the ambient temperature around the sample piece to 23° C., the temperature of the sample piece can be set to 23° C. by realizing temperature equilibrium. For example, in the magnetic layer containing a hexagonal ferrite powder and/or ε-iron oxide powder as the ferromagnetic powder, a direction of the magnetization hard axis of the magnetic layer is an in-plane direction. Regarding the unit, 1 [kOe]=($10^6/4\pi$) [A/m].

In the invention and the specification, the "center line average roughness Ra" is a center line average roughness Ra measured regarding a region of a surface to be measured having an area of 350 μm×260 μm by using a noncontact light interference type surface roughness measurement device. The measurement is performed 5 times at each of three different measurement positions. From the measurement results obtained at the three measurement positions, an arithmetic mean of measured values excluding a minimum value and a maximum value from Ra obtained by the measurement performed at each measurement position five times (that is, three measured values of one measurement position, nine measured values in a total of the three measurement positions) is used as Ra of a surface of the magnetic recording medium to be measured on the magnetic layer side. As the noncontact light interference type surface roughness measurement device, for example, a noncontact light interference type surface roughness measurement machine manufactured by Bruker Corporation, WYKO, ZYGO Corporation, or the like can be used. An example of a specific embodiment of Ra measurement conditions will be described later with reference to examples.

In the invention and the specification, the "1,1,1,2,2,3,4,5,5,5-decafluoropentane immersion" implies that a sample piece cut out from the magnetic recording medium is immersed in 1,1,1,2,2,3,4,5,5,5-decafluoropentane (20) g) at a liquid temperature of 20 to 25° C. for 1 hour. In a case where the magnetic recording medium, a 1-bromonaphthalene contact angle of which is to be measured is a magnetic tape, a sample piece having a length of 5 cm is cut out and immersed in 1,1,1,2,2,3,4,5,5,5-decafluoropentane. A width of the magnetic tape and a width of the sample piece cut out from the magnetic tape are generally ½ inches (1.27 cm). For a magnetic tape not having a width of ½ inches (1.27 cm), the sample piece having a length of 5 cm may be cut out and immersed in 1,1,1,2,2,3,4,5,5,5-decafluoropentane. In a case where the magnetic recording medium, a 1-bromonaphthalene contact angle of which is to be measured is a magnetic disc, a sample piece having a size of 5 cm×1.27 cm is cut out and immersed in 1,1,1,2,2,3,4,5,5,5-decafluoropentane.

Two sample pieces are cut out from the same magnetic recording medium. A I-bromonaphthalene contact angle θ1 is obtained without immersing one sample piece in the 1,1,1,2,2,3,4,5,5,5-decafluoropentane, and a 1-bromonaphthalene contact angle θ2 is obtained after immersing the other sample piece in the 1,1,1,2,2,3,4,5,5,5-decafluoropentane. A ratio θr is obtained as a ratio (θ2/θ1) of the θ2 to the θ1 obtained as described above.

In the invention and the specification, a "contact angle with respect to 1-bromonaphthalene" is a value measured by a liquid droplet method. Specifically, each of the 1-bromonaphthalene contact angles θ1 and 02 is an arithmetic mean of values obtained performing the measurement six times regarding the sample piece to be measured by a θ/2 method in a measurement environment with an ambient temperature of 25° C. and relative humidity of 50%. An example of a specific embodiment of measurement conditions will be described later with reference to examples. The ratio θr is a ratio calculated as "θ2/θ1". The measurement of the 1-bromonaphthalene contact angle is performed after leaving the sample piece to be measured in an environment of a temperature of 25° C. and relative humidity of 50% for 2 hours or longer.

The anisotropic magnetic field Hk of the magnetic recording medium is 12 kOe or more. The magnetic recording medium having a high Hk tends to have deteriorated electromagnetic conversion characteristics. On the other hand, in the magnetic recording medium, the center line average roughness Ra of the surface on the magnetic layer side is 1.2 nm or less, and the ratio θr is 0.95 or less. These can contribute to that the magnetic recording medium having an anisotropic magnetic field Hk of 12 kOe or more can exhibit excellent electromagnetic conversion characteristics. In this regard, the inventors surmise as follows. However, the invention is not limited to other surmises described in this specification.

In recording data on a magnetic recording medium and reproducing the recorded data, the surface of the magnetic recording medium on the magnetic layer side is generally a surface that slides in contact with a magnetic head for recording and/or reproducing. Accordingly, the reduction of the spacing between the surface and the magnetic head can contribute to the improvement of the electromagnetic conversion characteristics by reducing the spacing loss. From this point, the Ra of the magnetic recording medium which is 1.2 nm or less can contribute to the improvement of electromagnetic conversion characteristics. Meanwhile, in a case where the smoothness of the surface that slides on the magnetic head is increased, a coefficient of friction during the sliding of the surface and the magnetic head, and stick slip is likely to occur, so that spacing fluctuation is likely to occur. For example, the spacing fluctuation can cause the ferromagnetic particles positioned inside the magnetic layer to be difficult to reverse the magnetization (hard to be recorded). That is, although the increasing of the smoothness of the surface of the magnetic recording medium on the magnetic layer side can contribute to improvement of the electromagnetic conversion characteristics by reducing the spacing, the spacing fluctuations are likely to occur, and this may cause a deterioration in electromagnetic conversion characteristics. On the other hand, in the magnetic recording medium, the Ra of the surface on the magnetic layer side is 1.2 nm or less, and the ratio θr is 0.95 or less. It is considered that the ratio θr of 0.95 or less can contribute to the reduction of the coefficient of friction during the sliding of the surface of the magnetic recording medium on the magnetic layer side and the magnetic head, and as a result, it is surmised that it is possible to suppress a deterioration of electromagnetic conversion characteristics due to the spacing fluctuation. With respect to this ratio θr, a small value of the ratio implies that the 1-bromonaphthalene contact angle θ2 after immersion is smaller than the 1-bromonaphthalene contact angle θ1 before the 1,1,1,2,2,3,4,5,5,5-decafluoropentane immersion. Accordingly, as the ratio θr is small, it can be said that a component for increasing the value of the 1-bromonaphthalene contact angle is easily removed by the 1,1,1,2,2,3,4,5,5,5-decafluoropentane immersion. The inventors have surmised that this represents that one or more kinds of a lubricant normally contained in the magnetic recording medium is easily released from the surface of the magnetic layer side. It is considered that, this easily released component exhibits lubrication performance during sliding with the magnetic head, so that the coefficient of friction can be reduced during the sliding of the surface of the magnetic recording medium having the Ra of 1.2 nm or less and high surface smoothness on the magnetic layer side and the magnetic head. Based on the above, the inventors have considered that, in the magnetic recording medium having an anisotropic magnetic field Hk of 12 kOe or more, the electromagnetic conversion characteristics can be improved.

Hereinafter, the magnetic recording medium will be further described in detail.

Anisotropic Magnetic Field Hk

The anisotropic magnetic field Hk of the magnetic recording medium is 12 kOe or more, and can be 13 kOe or more, 14 kOe or more, 15 kOe or more, 16 kOe or more, 17 kOe or more, 18 kOe or more, 19 kOe or more, or 20 kOe or more. The anisotropic magnetic field Hk of the magnetic recording medium can be, for example, 1N) kOe or less, 90 kOe or less, 80 kOe or less, 70 kOe or less, 60 kOe or less, 50 kOe or less, or 40 kOe or less. From a viewpoint of improving the recording density, the magnetic recording medium having a high anisotropic magnetic field Hk is preferable. The anisotropic magnetic field Hk of the magnetic recording medium can be controlled, for example, by the physical properties of the ferromagnetic powder contained in the magnetic layer (for example, anisotropy constant Ku).

Ratio θr

In the magnetic recording medium, from a viewpoint of improving the electromagnetic conversion characteristics, the ratio θr is 0.95 or less, preferably 0.94 or less, more preferably 0.93 or less, even more preferably 0.92 or less, still preferably 0.91 or less, and still more preferably 0.90 or less, and the smaller the value of the ratio θr, the more preferable. For example, the ratio θr can be 0.30 or more, 0.40 or more, or 0.50 or more, and can also be lower than the value exemplified above. The Or can be adjusted according to the type of component contained in the magnetic recording medium as a lubricant, manufacturing conditions of the magnetic recording medium, and the like. This point will be further described later.

For the magnetic recording medium, in a case where the ratio θr is 0.95 or less, the values of θ1 which is the 1-bromonaphthalene contact angle before the 1,1,1,2,2,3,4,5,5,5-decafluoropentane immersion and 02 which is the 1-bromonaphthalene contact angle after the 1,1,1,2,2,3,4,5,5,5-decafluoropentane immersion are not particularly limited. In the one embodiment, the θ1 can be 20° or more, 23° or more, or 25° or more, and 70° or less, 68° or less, or 65° or less. In the one embodiment, the θ2 can be 15' or more, 17° or more, or 19° or more, and 60° or less, 58° or less, or 56° or less.

Center Line Average Roughness Ra of Surface on Magnetic Layer Side

In the magnetic recording medium, from a viewpoint of improving the electromagnetic conversion characteristics, the center line average roughness Ra of the surface on the magnetic layer side is 1.2 nm or less, preferably 1.1 nm or less, even more preferably 1.0 nm or less, still preferably 0.9 nm or less, still more preferably 0.8 nm or less, still even more preferably 0.7 nm or less, and the smaller the Ra value, the more preferable. The Ra can be, for example, 0.1 nm or more, 0.2 nm or more, 0.3 nm or more, 0.4 nm or more, or 0.5 nm or more, and can be lower than the values exemplified above. The Ra can be controlled by the manufacturing conditions of the magnetic recording medium (for example, calendar process conditions which will be described later) and the like.

Magnetic Layer

Ferromagnetic Powder

The ferromagnetic powder contained in the magnetic layer of the magnetic recording medium can be preferably a ferromagnetic powder selected from the group consisting of a hexagonal ferrite powder and an ε-iron oxide powder. The hexagonal ferrite powder and the z-iron oxide powder are preferred ferromagnetic powders for producing the magnetic recording medium having a high Hk. The magnetic layer of the magnetic recording medium can, for example, include one kind alone or two or more kinds of ferromagnetic powder selected from the group consisting of a hexagonal ferrite powder and an ε-iron oxide powder.

Regard the particle size of the ferromagnetic powder, an average particle volume which is an index of particle sizes is preferably 2,50) nm or less, more preferably 2.300 nm$^3$ or less, even more preferably 2,000 nm$^3$ or less, still more preferably 1,500 nm$^3$ or less, from a viewpoint of improving recording density. From a viewpoint of magnetization stability, the average particle volume of the ferromagnetic powder is preferably 500 nm$^3$ or more, more preferably 600 nm$^3$ or more, even more preferably 650 nm$^3$ or more, and still preferably 700 nm$^3$ or more. The average particle volume described above is a value obtained as a sphere-equivalent volume from the average particle size obtained by the method which will be described later.

Hexagonal Ferrite Powder

In the one embodiment, the magnetic recording medium can contain a hexagonal ferrite powder in the magnetic layer. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

The hexagonal ferrite powder is preferably a hexagonal strontium ferrite powder or a hexagonal barium ferrite powder, and is more preferably a hexagonal strontium ferrite powder, from a viewpoint of further increasing the Hk of the magnetic recording medium.

Hereinafter, the hexagonal strontium ferrite powder which is one embodiment of the hexagonal ferrite powder will be described more specifically. At least a part of the items described below for hexagonal strontium ferrite powders may also apply to hexagonal barium ferrite powders.

The anisotropy constant Ku can be used as an index of reduction of thermal fluctuation, that is, improvement of thermal stability. The hexagonal strontium ferrite powder can preferably have Ku equal to or greater than $1.8 \times 10^5$ J/m$^3$, and more preferably have Ku equal to or greater than $2.0 \times 10^5$ J/m$^3$. In addition, Ku of the hexagonal strontium ferrite powder can be, for example, equal to or smaller than $2.5 \times 10^5$ J/m$^3$. However, the high Ku is preferable, because it means high thermal stability, and thus, Ku is not limited to the exemplified value. A unit of the anisotropy constant Ku is 1 erg/cc=$1.0 \times 10^{-1}$ J/m$^3$.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0.

The content of rare earth atom of the hexagonal strontium ferrite powder which will be described later is identical to the rare earth atom bulk content. In contrast, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >0.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface on the magnetic layer side due to the sliding with the magnetic head. That is, it is surmised that the hexagonal strontium ferrite powder having the rare earth atom surface layer portion uneven distribution also contributes to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atoms are included, the bulk content is obtained from the total of the two or more kinds of rare earth atoms. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later. "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as a powder, sample powder for the partial dissolving and the total dissolving are collected from the powder of the same lot. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70□C for 1 hour. The obtained solution is filtered with a membrane filter having a hole diameter of 0.1 μm. The element analysis of the filtrate obtained as described above is performed by an inductively coupled plasma (ICP) analysis device. By doing so, the rare earth atom surface layer portion content with respect to 10 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80□C for 3 hours. After that, the process is performed in the same manner as in the partial dissolving and the measurement of the surface layer portion content, and the bulk content with respect to 100 atom % of the iron atom can be obtained.

From a viewpoint of increasing reproduction output in a case of reproducing data recorded on a magnetic recording medium, it is desirable that the mass magnetization as of ferromagnetic powder included in the magnetic recording medium is high. In regards to this point, in hexagonal strontium ferrite powder which includes the rare earth atom but does not have the rare earth atom surface layer portion uneven distribution, as tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one embodiment, σs of the hexagonal strontium ferrite powder can be equal to or greater than 45 A·m² kg and can also be equal to or greater than 47 A·m²/kg. On the other hand, from a viewpoint of noise reduction, σs is preferably equal to or smaller than 80 A·m²/kg and more preferably equal to or smaller than 60 A·m²/kg, as can be measured by using a well-known measurement device capable of measuring magnetic properties such as a vibrating sample magnetometer. In the invention and the specification, the mass magnetization σs is a value measured at a magnetic field strength of 15 kOe, unless otherwise noted.

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type. A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one embodiment, the hexagonal strontium ferrite powder does not include a bismuth atom (Bi).

ε-Iron Oxide Powder

In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a producing method of the ε-iron oxide powder, a producing method from a goethite, and a reverse micelle method are known. All of the producing methods are well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. SI. pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the methods described here.

The anisotropy constant Ku can be used as an index of reduction of thermal fluctuation, that is, improvement of thermal stability. The ε-iron oxide powder can preferably have Ku equal to or greater than $3.0 \times 10^4$ J/m³, and more preferably have Ku equal to or greater than $8.0 \times 10^4$ J/m³. In addition. Ku of the ε-iron oxide powder can be, for example, equal to or smaller than $3.0 \times 10^5$ J/m³. However, the high Ku is preferable, because it means high thermal stability, and thus, Ku is not limited to the exemplified value.

From a viewpoint of increasing reproduction output in a case of reproducing data recorded on a magnetic recording medium, it is desirable that the mass magnetization as of ferromagnetic powder included in the magnetic recording medium is high. In regard to this point, in one embodiment, σs of the ε-iron oxide powder can be equal to or greater than 8 A·m²/kg and can also be equal to or greater than 12 A·m²/kg. On the other hand, from a viewpoint of noise reduction, σs of the ε-iron oxide powder is preferably equal to or smaller than 40 A·m² kg and more preferably equal to or smaller than 35 A·m²/kg.

In the invention and the specification, average particle sizes of various powders are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. The powder included in the magnetic layer of the magnetic recording medium can be imaged using a cutting piece produced by the following method, and an image of the particles described above can be obtained. A magnetic recording medium adheres to a resin block or the like, a cutting piece is produced using a microtome or the like, and the produced cutting piece is observed with a transmission electron microscope to specify and image the magnetic layer portion. For example, for a tape-shaped magnetic recording medium (that is, a magnetic tape), the magnetic tape can be cut in a longitudinal direction to produce a cutting piece.

A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. Unless otherwise noted, the average particle size shown in examples which will be described later is a value measured by using transmission electron microscope H-9000 manufactured by Hitachi high-tech corporation as the transmission electron microscope, and image analysis software KS-400 manufactured by Carl Zeiss as the image analysis software, and the average particle volume of the ferromagnetic powder is a value calculated as a sphere-equivalent volume from the average particle size thus obtained. In the invention and the specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted.

(1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder in the magnetic layer is preferably in a range of 50% to 90% by mass and more preferably in a range of 60% to 90% by mass. A high filling percentage of the ferromagnetic powder in the magnetic layer is preferable from a viewpoint of improvement of recording density.

Binding Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, description disclosed in paragraphs 0028 to 0031 of JP2010-024113A can be referred to. The content of the binding agent of the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter) '30.0 cm)

Eluent: Tetrahydrofuran (THF)

Curing Agent

A curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate, is suitable. For details of the polyisocyanate, descriptions disclosed in paragraphs 0124 and 0125 of JP2011-216149A can be referred to, for example. The content of the curing agent in the magnetic layer forming composition can be, for example, 0 to 80.0 parts by mass with respect to 100.0 parts by mass of the binding agent, and can be 50.0 to 80.0 parts by mass, from a viewpoint of improvement of hardness of the magnetic layer.

Additives

The magnetic layer may include one or more kinds of additives, as necessary. As the additives, the curing agent described above is used as an example. In addition, examples of the additive included in the magnetic layer include a non-magnetic powder (for example, inorganic powder, carbon black, and the like), a lubricant, a dispersing agent, a dispersing assistant, a fungicide, an antistatic agent, and an antioxidant. For example, for the dispersing agent, a description disclosed in paragraphs 0061 and 0071 of JP2012-133837A can be referred to. The dispersing agent may be added to a non-magnetic layer forming composition. For the dispersing agent which may be added to the non-magnetic layer forming composition, a description disclosed in a paragraph 0061 of JP2012-133837A can be referred to.

Fluorine-Containing Compound

The magnetic recording medium preferably contains a fluorine-containing compound in a portion of the magnetic layer side on the non-magnetic support. In the invention and the specification, the "portion of the magnetic layer side on the non-magnetic support" is a magnetic layer regarding the magnetic recording medium including the magnetic layer directly on the non-magnetic support, and is a magnetic layer and/or a non-magnetic layer regarding the magnetic recording medium including the non-magnetic layer which will be described later in detail between the non-magnetic support and the magnetic layer. Hereinafter, the "portion of the magnetic layer side on the non-magnetic support" is also simply referred to as a "portion of the magnetic layer side". The presence on the surface of the magnetic recording medium on the magnetic layer side is also included in the inclusion in the portion on the magnetic layer side. Since the fluorine-containing compound can function as a lubricant and can contribute to reducing the friction coefficient during the sliding of the surface of the magnetic recording medium on the magnetic layer side and the magnetic head, the fluorine-containing compound is preferably contained in the portion on the magnetic layer side. The inventors have considered that the presence of the fluorine-containing compound in the portion of the magnetic recording medium on the magnetic layer side in a state where it is easily removed by the 1,1,1,2,2,3,4,5,5,5-decafluoropentane immersion contributes to setting the value of the ratio θr to 0.95 or less.

The fluorine-containing compound is a compound containing one or more fluorine atoms (F) per molecule. As the fluorine-containing compound, a compound that is difficult to be maintained in the magnetic layer is preferable, from a viewpoint of reducing the ratio θr. From such a viewpoint, examples of the preferred fluorine-containing compound include fluorine-containing compounds represented by Formula 1.

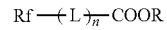

Formula 1

Hereinafter, Formula 1 will be described in more detail.

In Formula 1, Rf represents a fluorine-containing hydrocarbon group. A fluorine-containing hydrocarbon group is a monovalent group in which one or more of the hydrogen atoms constituting a saturated or unsaturated linear or branched hydrocarbon group are substituted with a fluorine atom. The number of carbon atoms of the fluorine-containing hydrocarbon group is 1 or more, preferably 2 or more, and more preferably 3 or more. The number of carbon atoms of the fluorine-containing hydrocarbon group is preferably 20 or less, more preferably 18 or less, even more preferably 16 or less, still preferably 14 or less, still more preferably 12 or less, still even more preferably 10 or less, and still further preferably 8 or less. The fluorine-containing hydrocarbon group represented by Rf is preferably a fluorine-substituted alkyl group in which one or more of the hydrogen atoms constituting the alkyl group are substituted with a fluorine atom, more preferably a fluorine-substituted alkyl group in which two or more of the hydrogen atoms constituting the alkyl group are substituted with a fluorine atom, and even more preferably a perfluoroalkyl group in which all of the hydrogen atoms constituting the alkyl group are substituted with a fluorine atom.

In Formula 1, n is 0 or 1.

In Formula 1. L represents a divalent linking group. Examples of the divalent linking group represented by L include an alkylene group, an ester group (—C(=O)O—), or a divalent linking group consisting of a combination of an alkylene group and an ester group. The alkylene group contained in the divalent linking group represented by L can be, for example, an alkylene group having 1 to 20 carbon atoms. A divalent linking group consisting of a combination of an alkylene group and an ester group can include one or more alkylene groups and one or more ester groups. In a case where the linking group represented by L contains two or more alkylene groups, the number of carbon atoms of the alkylene group described above is a total number of carbon atoms of the contained alkylene group. The alkylene group contained in the divalent linking group represented by L can be a substituted or unsubstituted alkylene group. Examples of the substituent contained in the substituted alkylene group include a hydroxy group, a carboxy group, and a salt thereof (for example, an alkali metal salt), a sulfonic acid group and a salt thereof (for example, an alkali metal salt), and a phosphoric acid group and a salt thereof (for example, alkali metal salt). The number of carbon atoms of the substituted alkylene group is the number of carbon atoms excluding the number of carbon atoms of the substituent portion.

In Formula 1. R represents a hydrogen atom, an alkyl group, or a fluorine-containing hydrocarbon group.

Examples of the alkyl group represented by R include a substituted or unsubstituted linear or branched alkyl groups. For the substituents of the substituted alkyl group, the above description regarding the substituents of the substituted alkylene group can be referred to. The number of carbon atoms of the alkyl group represented by R can also be 1 or more and 2 or more. In addition, the number of carbon atoms of the alkyl group represented by R can be, for example, 10 or less, 8 or less, 6 or less, 4 or less, or 2 or less. The number of carbon atoms of the substituted alkyl group is the number of carbon atoms excluding the number of carbon atoms of the substituent portion.

In a case where R represents a hydrogen atom, the compound represented by Formula 1 is a compound containing a carboxy group (—COOH). In this case, the carboxy group may be present in a form of a salt such as a metal salt (for example. —COO$^-$M$^+$; M$^+$ represents a metal ion), and such a compound is also included in a compound represented by the formula 1.

For the fluorine-containing hydrocarbon group represented by R, the above description regarding the fluorine-containing hydrocarbon group represented by Rf can be referred to.

The fluorine-containing compound represented by Formula 1 is available as a commercially available product, and can also be synthesized by a well-known method. Specific examples of the fluorine-containing compound represented by Formula 1 include various fluorine-containing compounds used in examples which will be described later.

One kind or two or more kinds of the fluorine-containing compounds can be used for manufacturing a magnetic recording medium. In the one embodiment, a coating solution containing a fluorine-containing compound is prepared, and the coating solution is applied to the surface of the magnetic layer (so-called overcoating), so that the fluorine-containing compound can be present in a portion on the magnetic layer side. The coating amount here is preferably 0.1 to 50 mg/cm$^2$ as the coating amount of the fluorine-containing compound per unit area, from a viewpoint of further reducing the value of the ratio θr. The coating solution containing the fluorine-containing compound can be prepared by mixing the fluorine-containing compound with one or more kinds of solvents. The kind of solvent used for preparing such a coating solution and a concentration of the fluorine-containing compound in the coating solution is not particularly limited. As the solvent, for example, one kind or two or more kinds of a ketone-based solvent (for example, methyl ethyl ketone, cyclohexanone, and the like) and a fluorine-based solvent (for example, 1,1,1,2,2,3,4,5,5,5-decafluoropentane) can be used. In addition, in the one embodiment, it is possible to produce a magnetic recording medium containing the fluorine-containing compound in the portion on the magnetic layer side, by adding the fluorine-containing compound as a component of a magnetic layer forming composition. In this case, the content of the fluorine-containing compound in the magnetic layer forming composition (or the magnetic layer) is preferably 0.5 to 1.5 parts by mass with respect to 100.0 parts by mass of the ferromagnetic powder, from a viewpoint of reducing the value of the ratio θr.

In addition, it is also possible to produce a magnetic recording medium by using one or more kinds of other compounds by adding the fluorine-containing compound as a compound capable of functioning as a lubricant. As such a compound, one or more kinds of compounds selected from the group consisting of fatty acids and derivatives thereof (for example, fatty acid amides, fatty acid esters, and the like) can be used. By using the magnetic layer forming composition and/or the non-magnetic layer forming composition containing the compound described above, a magnetic recording medium containing the compound described above in a portion on the magnetic layer side can be produced.

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the portion on the magnetic layer side in a state of salt such as metal salt.

As fatty acid amide, amide of various fatty acids described above, for example, lauric acid amide, myristic acid amide, palmitic acid amide, and stearic acid amide can be used.

Examples of fatty acid ester include ester of the various fatty acids described above, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

A content of fatty acid is, for example, 0.1 to 10.0 parts by mass and preferably 0.5 to 7.0 parts by mass with respect to 100.0 parts by mass of the ferromagnetic powder as the content in the magnetic layer forming composition (or magnetic layer: the same applies hereinafter). In a case where two or more kinds of different fatty acids are added to the magnetic layer forming composition, the content thereof is a total content thereof. This point also applies to the contents of other components in the specification, unless otherwise noted.

The content of fatty acid in the non-magnetic layer forming composition (or non-magnetic layer: the same applies hereinafter) is, for example, 1.0 to 10.0 parts by mass and is preferably 0.5 to 7.0 parts by mass with respect to 100.0 parts by mass of non-magnetic powder.

The content of fatty acid amide in the magnetic layer forming composition is, for example, 0 to 3.0 parts by mass, preferably 0.1 to 3.0 parts by mass, and more preferably 0.1 to 1.0 parts by mass with respect to 100.0 parts by mass of the ferromagnetic powder.

The content of fatty acid amide in the non-magnetic layer forming composition is, for example, 0.1 to 3.0 parts by mass and is preferably 0.1 to 1.0 parts by mass with respect to 100.0 parts by mass of non-magnetic powder.

The content of fatty acid ester in the magnetic layer forming composition is, for example, 0 to 10.0 parts by mass and is preferably 1.0 to 7.0 parts by mass with respect to 100.0 parts by mass of ferromagnetic powder.

The content of fatty acid ester in the non-magnetic layer forming composition is, for example, 0 to 10.0 parts by mass and is preferably 1.0 to 7.0 parts by mass with respect to 100.0 parts by mass of non-magnetic powder.

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on a surface of the non-magnetic support or may include a magnetic layer on the surface of the non-magnetic support with a non-magnetic layer including a non-magnetic powder interposed therebetween. An average particle size of the non-magnetic powder is preferably in a range of 5 to 500 nm and more preferably in a range of 10 to 200 nm. The non-magnetic powder used in the non-magnetic layer may be an inorganic powder or an organic powder. In addition, carbon black and the like can be used. Examples of the inorganic powder include powders of metal, metal oxide, metal carbonate, metal sulfate, metal nitride, metal carbide, and metal sulfide. These non-magnetic powder can be purchased as a commercially available product or can be produced by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer contains a non-magnetic powder and can also contain a binding agent together with the non-magnetic powder. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Back Coating Layer

The magnetic recording medium can also include a back coating layer including a non-magnetic powder on a surface side of the non-magnetic support opposite to the surface side on which the magnetic layer is provided. The back coating layer preferably includes any one or both of carbon black and inorganic powder. For example, as the non-magnetic powder of the back coating layer, one or both of carbon black having an average particle size of 15 to 50 nm and carbon black having an average particle size of 75 to 500 nm can be used. A carbon black content in the back coating layer is preferably in a range of 50.0 to 200.0 parts by mass and more preferably in a range of 75.0 to 150.0 parts by mass, with respect to 100.0 parts by mass of the binding agent.

In one embodiment, the back coating layer can include one or more kinds of inorganic powders together with a carbon black. A mixing ratio of the inorganic powder to the carbon black is preferably 9:1 to 7:3 as the inorganic powder:carbon black (based on mass). Examples of the inorganic powder include an inorganic powder having an average particle size of 80 to 250 nm and a Mohs hardness of 5 to 9. Examples of the inorganic powder include a non-magnetic powder generally used for the non-magnetic layer and a non-magnetic powder generally used as an abrasive for the magnetic layer, and among them, ε-iron oxide, α-alumina, and the like are preferable. A content of the inorganic powder in the back coating layer is preferably in a range of 300.0 to 700.0 parts by mass and more preferably in a range of 400.0 to 500.0 parts by mass with respect to 100.0 parts by mass of the binding agent.

The back coating layer may include a non-magnetic powder, can include a binding agent, and can also include one or more kinds of additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

In the one embodiment, after applying a coating solution containing a fluorine-containing compound to a surface of the back coating layer (so-called overcoating), at least a part of the fluorine-containing compound contained in the coating solution applied to the surface of the back coating layer is transferred to the surface of the magnetic layer during the manufacturing step of the magnetic recording medium, and accordingly, the fluorine-containing compound can be present in the portion on the magnetic layer side. For details of the coating solution, coating amount, and the like used here, the above description can be referred to.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment-easy-bonding treatment, or heat treatment may be performed with respect to these supports in advance.

Various Thicknesses

A thickness of the non-magnetic support is, for example, 3.0 to 50.0 μm, preferably 3.0 to 10.0 μm, and more preferably 3.0 to 5.0 sm.

A thickness of the magnetic layer can be optimized according to a saturation magnetization amount of a magnetic head used, a head gap length, a recording signal band, and the like, and is generally 10 to 150 nm, preferably 20 to 120 nm, and more preferably 30 to 100 nm, from a viewpoint of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably equal to or smaller than 0.9 μm and even more preferably 0.1 to 0.7 μm.

The thicknesses of various layers and the non-magnetic support of the magnetic recording medium can be obtained by a well-known film thickness measurement method. As an example, a cross section of the magnetic tape in a thickness direction is exposed by a well-known method of ion beams or microtome, and the exposed cross section is observed with a scanning electron microscope. In the cross section observation, various thicknesses can be obtained as the thickness obtained at one portion, or as an arithmetic mean of thicknesses obtained at a plurality of portions which are two or more portions randomly extracted, for example, two portions. Alternatively, the thickness of each layer may be obtained as a designed thickness calculated under the manufacturing conditions.

Manufacturing Step

Composition for forming the magnetic layer, the non-magnetic layer, and the back coating layer generally includes a solvent, together with the various components described above. As the solvent, various organic solvents generally used for manufacturing a coating type magnetic recording medium can be used. The amount of solvent in each layer forming composition is not particularly limited, and can be identical to that in each layer forming composition of a typical coating type magnetic recording medium. A step of preparing each layer forming composition can generally include at least a kneading step, a dispersing step, and a mixing step provided before and after these steps, as necessary. Each step may be divided into two or more stages. Various components used in the preparation of each layer forming composition may be added at the beginning or during any step. In addition, each component may be separately added in two or more steps.

In order to prepare each layer forming composition, a well-known technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads may be used by optimizing a particle diameter (bead diameter) and a filling percentage of the dispersion beads. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed, for example, by directly applying the magnetic layer forming composition onto the non-magnetic support or performing multilayer coating of the magnetic layer forming composition with the non-magnetic layer forming composition sequentially or at the same time. The back coating layer can be formed by applying a back coating layer forming composition onto a side of the non-magnetic support opposite to the side provided with the magnetic layer (or to be provided with the magnetic layer). For details of the coating for forming each layer, a description disclosed in a paragraph 0051 of JP2010-024113A can be referred to.

After the coating step, various processes such as a drying process, an alignment process of a magnetic layer, and a surface smoothing process (calendar process) can be performed. For details of the various steps, a well-known technology disclosed in paragraphs 0052 to 0057 of JP2010-024113A can be referred to, for example. For example, the coating layer of the magnetic layer forming composition can be subjected to an alignment process, while the coating layer is wet. For the alignment process, various well-known technologies such as descriptions disclosed in a paragraph 0067 of JP2010-231843A can be used. For example, a homeotropic alignment process can be performed by a well-known method such as a method using a different polar opposing magnet. In the alignment zone, a drying speed of the coating layer can be controlled by a temperature, an air flow of the warm air and/or a transportation rate of the non-magnetic support on which the coating layer is formed in the alignment zone. In addition, the coating layer may be preliminarily dried before transporting to the alignment zone. Further, regarding the calendar process, in a case where the calendar condition is strengthened, the value of Ra of the surface of the magnetic recording medium on the magnetic layer side tends to decrease. The calendar conditions include a calendar pressure, a calendar temperature (surface temperature of the calendar roll), a calendar speed, the hardness of the calendar roll, and the like, as values of the calendar pressure, the calendar temperature, and the hardness of the calendar roll are increased, the calendar process is reinforced, and as the calendar speed is low, the calendar process is reinforced. For example, the calendar pressure (linear pressure) can be 200 to 500 kN/m and is preferably 250 to 350 kN/m. The calendar temperature (surface temperature of the calendar roll) can be, for example, 85 to 120° C., is preferably 90 to 110° C., and the calendar speed can be, for example, 50 to 300 m/min and is preferably 50 to 200 m/min.

In the one embodiment, in a case of overcoating the fluorine-containing compound as described above, it is preferable to burnish and/or wipe the surface of the magnetic layer prior to overcoating. The inventors have considered that, by performing these processes, it is possible to increase adhesion properties of a component (for example, compound selected from the group consisting of fatty acids described above and derivatives thereof) included in the magnetic layer by being added to the magnetic layer forming composition to the ferromagnetic particles. The inventors have surmised that, as a result, the adsorption of the over-coated fluorine-containing compound to the ferromagnetic particles is inhibited, so that the fluorine-containing compound is easily released to the surface of the magnetic recording medium on the magnetic layer side, and as a result, the ratio θr tends to decrease. The burnishing process is a process of rubbing a surface of a process target with a member (for example, abrasive tape or a grinding tool such as a blade for grinding or a wheel for grinding) and can be performed in the same manner as a well-known burnishing process for manufacturing a coating type magnetic recording medium.

The burnishing process can be preferably performed by performing one or both of rubbing (polishing) of a surface of a coating layer which is a process target with an abrasive tape, and rubbing (grinding) of a surface of a coating layer which is a process target with a grinding tool. The wiping process can be performed by wiping the surface of the magnetic layer with a wiping material. In addition, the wiping process may be performed after the burnishing process. In the burnishing process, in a case where the magnetic layer forming composition contains an abrasive, it is preferable to use an abrasive tape containing at least one kind of an abrasive having a Mohs hardness higher than that of the abrasive. As the abrasive tape, a commercially available product may be used or an abrasive tape produced by a well-known method may be used. In addition, as the grinding tool, a well-known blade for grinding such as a fixed type blade, a diamond wheel, or a rotary blade, or a wheel for grinding can be used. Further, a wiping process of wiping the surface of the coating layer rubbed with the abrasive tape and/or the grinding tool with a wiping material may be performed. For details of the preferable abrasive tape, grinding tool, burnishing process, and wiping process, paragraphs 0034 to 0049, FIG. 1, and examples of JP1994-052544A (JP-H06-052544A) can be referred to.

The magnetic recording medium according to an embodiment of the invention can be a tape-shaped magnetic recording medium (magnetic tape), and may be a disk-shaped magnetic recording medium (magnetic disc). For example, the magnetic tape is normally accommodated in a magnetic tape cartridge and the magnetic tape cartridge is mounted on a magnetic recording and reproducing device. A servo pattern can be formed on the magnetic recording medium by a well-known method, in order to perform head tracking in the magnetic recording and reproducing device. The "formation of the servo pattern" can be "recording of a servo signal". Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear-tape-open (LTO) specification (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one embodiment, as shown in JP2004-318983A, information showing the number of servo bands (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively displaced in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate a leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is normally accommodated in a magnetic tape cartridge and the magnetic tape cartridge is mounted on a magnetic recording and reproducing device.

Magnetic Tape Cartridge

One aspect of the invention relates to a magnetic tape cartridge including the tape-shaped magnetic recording medium (that is, magnetic tape).

The details of the magnetic tape included in the magnetic tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data on the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer side of the magnetic tape, and accordingly, the recording and/or reproducing of data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. The magnetic tape cartridge may include the magnetic tape according to the embodiment of the invention, and well-known technologies can be applied for the other configurations.

Magnetic Recording and Reproducing Device

According to still another aspect of the invention, there is provided a magnetic recording and reproducing device including the magnetic recording medium described above.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which the surface of the magnetic layer side and the magnetic head are in contact with each other and slide, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic tape, and can also be a reproducing head capable of performing the reproducing of data recorded on the magnetic tape. In addition, in the embodiment, the magnetic recording and reproducing device can include both of a recording head and a reproducing head as separate magnetic heads. In another embodiment, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing the data are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an anisotropic magnetoresistive (AMR) head, a giant magnetoresistive (GMR) head, or a tunnel magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer side of the magnetic recording medium into contact with the magnetic head and sliding. The magnetic recording and reproducing device may include the magnetic recording medium according to the embodiment of the invention, and well-known technologies can be applied for the other configurations.

For example, in a case of recording data and/or reproducing the recorded data, first, tracking using a servo signal is performed. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can also perform the recording and/or reproducing with respect to other data bands. In this case, the servo signal reading element is moved to a predetermined servo band by using the UDIM information described above, and the tracking with respect to the servo band may be started.

EXAMPLES

Hereinafter, the invention will be described in more detail with reference to examples. However, the invention is not limited to embodiments shown in the examples. Unless otherwise noted, "parts" and "%" described below indicate "parts by mass" and "% by mass". Unless otherwise noted, the following steps and evaluations were performed in the atmosphere at 23° C.±1° C. "eq" described below indicates equivalent and is a unit not convertible into SI unit.

In Table 2 below, "SrFe" indicates a hexagonal strontium ferrite powder produced by the method described below, and "ε-iron oxide" indicates an ε-iron oxide powder produced by the method described below. "BaFe1" indicates a hexagonal barium ferrite powder having an average particle volume of 1.900 $nm^3$. "BaFe2" indicates a hexagonal barium ferrite powder having an average particle volume of 2,400 $nm^3$.

The average particle volume of the various ferromagnetic powders described below is a value obtained by the method described above. The various values related to the particle size of the various powders described below are also values obtained by the method described above.

The anisotropy constant Ku is a value obtained by the method described above regarding each ferromagnetic powder by using a vibrating sample magnetometer (manufactured by Toei Industry Co., Ltd.).

The mass magnetization as is a value measured using a vibrating sample magnetometer (manufactured by Toei Industry Co., Ltd.) at a magnetic field strength of 15 kOe.

Method for Producing Ferromagnetic Powder

Method for Producing Hexagonal Strontium Ferrite Powder 1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the produced amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder (in Table 2. "SrFe") obtained as described above, an average particle volume was 900 $nm^3$, an anisotropy constant Ku was $2.2 \times \times 10^5$ $J/m^3$, and a mass magnetization as was 49 $A \cdot m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PiXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree
Method for Producing ε-Iron Oxide Powder 4.0 g of ammonia aqueous solution having a concentration of 25% was added to a material obtained by dissolving 8.3 g of iron (111) nitrate nonahydrate, 1.3 g of gallium (111) nitrate octahydrate, 190 mg of cobalt (H) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an ambient temperature of 25° C., and the mixture was stirred for 2 hours still under the temperature condition of the ambient temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours, 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to heat treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicic acid compound which was an impurity was removed from the thermal-treated precursor of ferromagnetic powder.

After that, by the centrifugal separation process, ferromagnetic powder obtained by removing the silicic acid compound was collected and washed with pure water, and ferromagnetic powder was obtained.

The composition of the obtained ferromagnetic powder was confirmed by Inductively Coupled Plasma-Optical Emission Spectrometry (ICP-OES), and CGa, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as disclosed regarding the method for producing the hexagonal strontium ferrite powder described above, and it was confirmed that the obtained ferromagnetic powder has a crystal structure of a single phase which is an c phase not including a crystal structure of an a phase and a γ phase (ε-iron oxide type crystal structure) from the peak of the X-ray diffraction pattern.

Regarding the obtained (ε-iron oxide powder (in Table 2, "ε-iron oxide"), an average particle volume was 750 $nm^3$, an anisotropy constant Ku was $1.2 \times 10^5$ $J/m^3$, and a mass magnetization as was 16 A·$m^2$/kg.

Example 1

A list of each layer forming composition is shown below.
List of Magnetic Layer Forming Composition
Ferromagnetic powder (See Table 2): 100.0 parts
Polyurethane resin 17.0 parts
Branched side chain-containing polyester polyol/diphenylmethane diisocyanate-$SO_3Na$=400 eq/ton
α-$Al_2O_3$ (Average particle size: 150 nm): 5.0 parts
Diamond powder (average particle size: 60 nm): 1.0 part
Carbon black (average particle size: 20 nm): 1.0 part
Cyclohexanone: 110.0 parts
Methyl ethyl ketone: 100.0 parts
Toluene: 100.0 parts
Butyl stearate: 2.0 parts
Stearic acid: 1.0 part
List of Non-Magnetic Layer Forming Composition
Non-magnetic inorganic powder: ε-iron oxide: 100.0 parts
Average particle size: 10 nm
Average acicular ratio: 1.9
(Brunauer-Emmett-Teller (BET) specific surface area: 75 $m^2$/g.
Carbon black (average particle size: 20 nm): 25.0 parts
$SO_3Na$ group-containing polyurethane resin: 18.0 parts
Weight-average molecular weight: 70,00. $SO_3Na$ group: 0.2 meq/g
Stearic acid: 1.0 part
Cyclohexanone: 300.0 parts
Methyl ethyl ketone: 300.0 parts
List of Back Coating Layer Forming Composition
Non-magnetic inorganic powder (α-iron oxide): 85.0 parts
Surface treatment layer: $Al_2O_3$, $SiO_2$
Average particle size: 150 nm
Tap density: 0.8
Average acicular ratio: 7
BET specific surface area: 52 $m^2$/g
pH: 8
DBP(Dibutyl phthalate) oil absorption: 33 g/100 g
Carbon black (average particle size: 16 nm): 20.0 parts
Vinyl chloride copolymer (MR104 manufactured by Kaneka Corporation): 13.0 parts
Polyurethane resin (Byron UR820 manufactured by Toyobo Co., Ltd.): 6.0 parts
Phenylphosphonic acid: 3.0 parts
Alumina powder (average particle size: 0.25 μm): 5.0 parts
Cyclohexanone: 140.0 parts
Methyl ethyl ketone: 170.0 parts
Butyl stearate: 2.0 parts
Stearic acid: 1.0 part
Preparation of Each Layer Forming Composition Each component of each of the magnetic layer forming composition, the non-magnetic layer forming composition, and the back coating layer forming composition was kneaded with an open kneader for 240 minutes and then dispersed with a sand mill. The dispersion time was 720 minutes for the magnetic layer forming composition, and 1,080 minutes for each of the non-magnetic layer forming composition and the back coating layer forming composition, 4.0 parts of each of polyisocyanate (Coronate 3041 manufactured by Tosoh Corporation) was added to the dispersion liquid obtained as described above, and the mixture was further stirred and mixed for 20 minutes, and then filtered using a filter having a hole diameter of 0.5 μm.

Based on the above, the magnetic layer forming composition, a non-magnetic layer forming composition, and a back coating layer forming composition were prepared.

Production of Magnetic Tape Cartridge

The non-magnetic layer forming composition was applied to a surface of a support made of biaxial stretching polyethylene naphthalate having a thickness of 4.6 μm so that the thickness after drying is 0.7 pin, and dried in the environment of the ambient temperature of 100° C. to form a non-magnetic layer, and the magnetic layer forming composition was applied to the surface of the non-magnetic layer so that the thickness after drying is 60 nm, thereby forming a coating layer of the magnetic layer forming composition. A homeotropic alignment process was performed by applying a magnetic field having a magnetic field strength of 0.6 T in a vertical direction with respect to a surface of a coating layer, while the coating layer is wet. After that, the coating layer was dried to form a magnetic layer. The back coating layer forming composition was applied to the surface of the support on a side opposite to the surface where the non-magnetic layer and the magnetic layer were formed, so that the thickness after the drying is 0.4 μm, and was dried in the environment of the ambient temperature of 120° C. to form a back coating layer.

After that, the calendar process was performed at a calendar speed of 100 m/min, a linear pressure of 350 kg/cm (1 kg/cm is 0.98 kN/m) by a 7-stage calendar device composed of only one metal roll at calendar temperature shown in Table 2 (surface temperature of calendar roll).

After the calendar process, the surface of the magnetic layer was burnished and wiped. For the burnishing process and wiping process, a commercially available sapphire blade (manufactured by Kyocera Corporation, width of 5 mm, length of 35 mm, tip angle of 60 degrees) was used as a grinding blade, and a commercially available wiping material (product name: WRP736 manufactured by Kuraray Co., Ltd.) was used as the wiping material. As the process conditions for the burnishing process using the sapphire blade, the sapphire blade process conditions described in paragraph 0075 of JP1994-052544A (JP-H$_{06}$-052544A) were used.

The fluorine-containing compound shown in Table 2 was mixed with a solvent (using a mixed solvent of cyclo-hexanone and methyl ethyl ketone 1:1 (mass ratio)) to prepare a coating solution having a fluorine-containing compound concentration of 0.1%. This coating solution was applied to the surface of the magnetic layer after the burnishing process and the wiping process with a wire bar in an amount such that the coating amount of the fluorine-containing compound was as shown in Table 2 and dried.

After the overcoating, after performing heat treatment for 24 hours in an environment of an ambient temperature of 70° C. with respect to an elongated magnetic tape raw fabric, a slit was made to a width of ½ inches (1 inch is 0.0254 meters). In a state where the magnetic layer of the magnetic tape obtained by slitting was demagnetized, servo patterns having disposition and shapes according to the LTO Ultrium format were formed on the magnetic layer by using a servo write head mounted on a commercially available servo writer. Accordingly, a magnetic tape including data bands, servo bands, and guide bands in the disposition according to the LTO Ultrium format in the magnetic layer, and including servo patterns (timing-based servo pattern) having the disposition and the shape according to the LTO Ultrium format on the servo band was obtained. The obtained magnetic tape was wound around a reel of a magnetic tape cartridge (LTO Ultrium7 data cartridge), and each magnetic tape cartridge of Example 1 of a single reel type in which a magnetic tape having a length of 950 m was wound around the reel was produced.

Examples 2 to 15, and 17, Comparative Examples 1 to 7, and Reference Example 1

A magnetic tape cartridge was produced in the same manner as in the Example 1, except that various conditions shown in Table 2 were changed as shown in Table 2.

In Table 2, in the comparative examples and Reference Example 1 in which "none" is shown in the column of the "fluorine-containing compound", the overcoating of the coating solution containing the fluorine-containing compound was not performed.

Example 16

A magnetic tape cartridge was produced in the same manner as in Example 1, except that 0.5 parts by mass of the fluorine-containing compound shown in Table 2 with respect to 100.0 parts by mass of the ferromagnetic powder was added to the magnetic layer forming composition, and the burnishing process, the wiping process, and the overcoating of the coating solution containing the fluorine-containing compound were not performed.

For each of the examples, the comparative examples, and Reference Example 1, two magnetic tape cartridges were produced, one was used for evaluation of physical properties, and the other one was used for evaluation of electromagnetic conversion characteristics.

Evaluation Method of Physical Properties

Anisotropic Magnetic Field Hk

Regarding the magnetic tape extracted from the magnetic tape cartridge, the anisotropic magnetic field Hk was obtained by the method described above by using TM-VSM5050-SMS type (manufactured by Tamagawa Seisakusho Co., Ltd.) as a vibrating sample magnetometer.

Ratio θr

Two sample pieces having a length of 5 cm were cut out from each of the magnetic tapes of the examples and the comparative examples, and the 1-bromonaphthalene contact angle θ1 was obtained regarding one sample piece without performing 1,1,1,2,2,3,4,5,5,5-decafluoropentane immersion. For the other sample piece, the 1-bromonaphthalene contact angle θ2 was obtained after performing 1,1,2,2,3,4,5,5,5-decafluoropentane immersion by the method described above.

The 1-bromonaphthalene contact angle was measured on the surface of the sample piece on the magnetic layer side by the following method by using a contact angle measurement device (contact angle measurement device DropMaster700 manufactured by Kyowa Interface Science Co., Ltd.).

The sample piece was placed on a slide glass so that the surface on a back coating layer side was in contact with the slide glass surface, 2.0 μl of a measurement solution (1-bromonaphthalene) was added dropwise on the surface of the sample piece (the surface on the magnetic layer side), and after visually confirming that the dropped liquid formed stable liquid droplets, the above contact angle of the liquid droplet with the sample piece was measured by analyzing a liquid droplet image by a contact angle analysis software FAMAS attached to the contact angle measurement device. The contact angle was calculated by the θ/2 method, and the arithmetic mean of the values obtained by performing the measurement 6 times for one sample piece was defined as 1-bromonaphthalene contact angle θ1 or θ2. The measurement was performed in an environment with an ambient temperature of 25° C. and a relative humidity of 50%, and the contact angle was obtained under the following analysis conditions. The ratio θr was calculated from θ1 and θ2 thus obtained.

Method: Liquid droplet method (θ/2 method)
Droplet landing recognition: Automatic
Droplet landing recognition line (distance from needle tip): 50 dots
Algorithm: Automatic
Image mode: Frame
Threshold hold level: Automatic Center Line Average Roughness Ra of Surface on Magnetic Layer Side The measurement was carried out under the conditions shown in Table 1 by using a noncontact optical surface roughness measurement device, and the center line average roughness Ra of the surface of the magnetic tape on the magnetic layer side was obtained by the method described above.

TABLE 1

| | |
|---|---|
| Noncontact optical surface roughness measurement device | New View 6300 |
| Object lens | ×20 |
| Intermediate lens | ×10 |
| Image Zoom | ×1 |
| Measurement area | 350 μm × 260 μm |
| Distortion compensation | Cylinder |
| Camera Mode | 640 × 480 200 Hz |
| Data analysis software | Advanced Texture |
| Calibration | Measurement is performed after confirming accuracy by using the following standard. Step Height Standard (Model SHS-1.8 QC) manufactured by VLSI Standards Inc. SiC Reference Flat manufactured by Zygo Corporation |
| Method for attaching sample | A magnetic tape is placed on a glass plate and four corners of the magnetic tape are attached with an pressure sensitive adhesive tape so that sag is not visually confirmed. |

Evaluation of electromagnetic conversion characteristics
Each of the magnetic tape cartridges of the examples, the comparative examples, and Reference Example 1 was mounted to a magnetic recording and reproducing device, the magnetic tape was caused to run under the following running conditions, and a magnetic signal was recorded in the longitudinal direction of the magnetic tape under the following recording and reproducing conditions and was reproduced by a reproducing head (MR head). The reproduced signal was frequency-analyzed using a spectrum analyzer manufactured by Shibasoku Co., Ltd., and a ratio of the output of 300 kfci to the noise integrated in a range of 0 kfci to 600 kfci was defined as signal-to-noise-ratio (SNR). In addition, the unit kfci is a unit of linear recording density (cannot be converted to SI unit system). In a case of obtaining the SNR, a sufficiently stabilized signal was used after the running of the magnetic tape was started. Table 2 shows SNR as a relative value by setting the value of Comparative Example 1 as zero. In Comparative Example 5, the coefficient of friction during sliding between the surface of the magnetic layer side and the reproducing head was too high to measure the SNR, and therefore. Table 2 describes it as "not measurable".

—Running Conditions—
Transportation speed (head/tape relative speed): 5.5 m/sec
Length per pass: 1,000 m
—Recording and Reproducing conditions—
(Recording)
Recording track width: 5.0 μm
Recording gap: 0.17 μm
Saturated magnetic flux density (Bs) of magnetic head: 1.8 T
(Reproducing)
Reproducing track width: 0.4 μm
Distance between shields: 0.08 μm
Linear recording density: 300 kfci
The above results are shown in Table 2.

TABLE 2

| | Ferromagnetic powder | Hk | Fluorine-containing compound | Fluorine-containing compound coating amount | Fluorine-containing compound applying method | Calendar temperature | Ra | θ1 | θ2 | θr | SNR |
|---|---|---|---|---|---|---|---|---|---|---|---|
| Unit | — | kOe | — | mg/m² | — | °C. | mm | ° | ° | — | dB |
| Comparative Example 1 | BaFe1 | 13 | None | — | — | 80 | 1.5 | 32 | 30 | 0.93 | 0.0 |
| Comparative Example 2 | SrFe | 25 | None | — | — | 80 | 1.7 | 32 | 29 | 0.92 | −0.2 |
| Comparative Example 3 | ε-iron oxide | 30 | None | — | — | 80 | 1.8 | 31 | 29 | 0.92 | −0.4 |
| Comparative Example 4 | SrFe | 25 | A-1 | 2.8 | — | 80 | 1.7 | 51 | 42 | 0.82 | 0.0 |
| Comparative Example 5 | SrFe | 25 | None | — | Overcoating | 100 | 0.6 | 31 | 29 | 0.96 | Not measurable |
| Comparative Example 6 | SrFe | 25 | B-1 | 2.8 | — | 100 | 0.7 | 53 | 51 | 0.97 | 0.1 |
| Comparative Example 7 | SrFe | 25 | B-2 | 2.8 | Overcoating | 100 | 0.7 | 50 | 53 | 1.06 | 0.3 |
| Example 1 | SrFe | 25 | A-1 | 2.8 | Overcoating | 100 | 0.7 | 50 | 37 | 0.74 | 1.9 |
| Example 2 | SrFe | 25 | A-1 | 7.0 | Overcoating | 100 | 0.7 | 62 | 55 | 0.87 | 1.5 |
| Example 3 | SrFe | 25 | A-2 | 2.8 | Overcoating | 100 | 0.8 | 51 | 42 | 0.83 | 1.3 |
| Example 4 | SrFe | 25 | A-2 | 7.0 | Overcoating | 100 | 0.7 | 64 | 55 | 0.85 | 1.7 |
| Example 5 | SrFe | 25 | A-3 | 2.8 | Overcoating | 100 | 0.7 | 43 | 35 | 0.81 | 1.0 |
| Example 6 | SrFe | 25 | A-3 | 7.0 | Overcoating | 100 | 0.7 | 50 | 42 | 0.85 | 1.4 |
| Example 7 | SrFe | 25 | A-4 | 2.8 | Overcoating | 100 | 0.7 | 52 | 47 | 0.90 | 1.5 |
| Example 8 | SrFe | 25 | A-5 | 2.8 | Overcoating | 100 | 0.7 | 49 | 46 | 0.93 | 1.3 |
| Example 9 | SrFe | 25 | A-6 | 2.8 | Overcoating | 100 | 0.7 | 41 | 37 | 0.92 | 1.1 |
| Example 10 | SrFe | 25 | A-7 | 2.8 | Overcoating | 100 | 0.7 | 43 | 21 | 0.50 | 1.1 |
| Example 11 | SrFe | 25 | Tridecafluoroheptanic acid | 2.8 | Overcoating | 100 | 0.6 | 36 | 34 | 0.95 | 2.1 |
| Example 12 | SrFe | 25 | Methyl tridecafluoroheptanoate | 2.8 | Overcoating | 100 | 0.7 | 27 | 24 | 0.88 | 2.1 |
| Example 13 | ε-iron oxide | 30 | A-1 | 2.8 | Overcoating | 100 | 0.8 | 50 | 37 | 0.74 | 1.7 |
| Example 14 | ε-iron oxide | 30 | Methyl tridecafluoroheptanoate | 2.8 | Overcoating | 100 | 0.8 | 62 | 54 | 0.88 | 1.9 |
| Example 15 | SrFe | 25 | A-1 | 2.8 | Overcoating | 105 | 0.5 | 45 | 33 | 0.74 | 2.0 |
| Example 16 | SrFe | 25 | A-1 | — | Adding magnetic layer forming composition | 100 | 0.7 | 50 | 39 | 0.78 | 1.9 |

TABLE 2-continued

| | Ferro-magnetic powder | Hk | Fluorine-containing compound | Fluorine-containing compound coating amount | Fluorine-containing compound applying method | Calendar temperature | Ra | θ1 | θ2 | θr | SNR |
|---|---|---|---|---|---|---|---|---|---|---|---|
| Example 17 | SrFe | 25 | A-1 | 2.8 | Overcoating | 90 | 1.1 | 55 | 41 | 0.74 | 0.9 |
| Reference Example 1 | BaFe2 | 10 | None | — | — | 80 | 1.5 | 32 | 30 | 0.92 | 0.5 |

The structures of the fluorine-containing compounds shown in Table 2 are shown below. Hereinafter, "—CO$_2$H" is identical to "—COOH", and "—COO—" represents an ester group (—C(=O)O—).

| Fluorine-containing compounds | Structure |
|---|---|
| B-1 | $X^1$—CF$_2$O—[(CF$_2$O)$_p$—(CF$_2$CF$_2$O)$_q$]—CF$_2$X$^1$    $X^1$=CF$_2$—CH$_2$—O—CH$_2$—CH(OH)—CH$_2$—OH |
| B-2 | $X^2$—CF$_2$O—[(CF$_2$O)$_p$—(CF$_2$CF$_2$O)$_q$]—CF$_2$X$^2$    $X^2$=COOH |
| A-1 | [perfluorinated branched chain with CO$_2$H terminus] |
| A-2 | [perfluorinated branched chain with extended alkyl CO$_2$H terminus] |
| A-3 | [perfluorinated branched chain with extended alkyl CO$_2$H terminus] |
| A-4 | [perfluorinated branched chain with CO$_2$H terminus] |
| A-5 | [perfluorinated branched chain with COOH terminus] |
| A-6 | [perfluorinated branched chain with COOH terminus] |
| A-7 | [perfluorinated branched diester structure with COO linkage] |
| Tridecafluoroheptanic acid | [CF$_3$(CF$_2$)$_5$COOH structure] |

| Fluorine-containing compounds | Structure |
|---|---|
| Methyl tridecafluoroheptanoate | 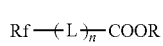 |

For example, from the comparison between Reference Example 1 and Comparative Example 1, it can be confirmed that, in a case where the Hk of the magnetic tape is 12 kOe or more, the electromagnetic conversion characteristics tend to decrease.

In contrast, in Examples 1 to 17 in which Ra and the ratio θr measured on the surface on the magnetic layer side are in the ranges described above, the Hk of the magnetic tape is 12 kOe or more, but a higher SNR value was obtained, compared to the comparative examples.

One embodiment of the invention is useful in the technical field of magnetic recording media for high density recording.

What is claimed is:

1. A magnetic recording medium comprising:
a non-magnetic support; and
a magnetic layer including a ferromagnetic powder,
wherein an anisotropic magnetic field Hk is 12 kOe or more,
a center line average roughness Ra of a surface of the magnetic recording medium on a magnetic layer side is 1.2 nm or less,
a ratio θr of a contact angle θ2 with respect to 1-bromonaphthalene, measured on a surface on the magnetic layer side after a 1,1,1,2,2,3,4,5,5,5-decafluoropentane immersion of the magnetic recording medium, to a contact angle θ1 with respect to 1-bromonaphthalene, measured on the surface on the magnetic layer side before the 1,1,1,2,2,3,4,5,5,5-decafluoropentane immersion of the magnetic recording medium is 0.95 or less,
the magnetic recording medium further comprises a fluorine-containing compound in a portion of the magnetic layer side on the non-magnetic support,
and the fluorine-containing compound is one or more compounds selected from the group consisting of:
(ii) a fluorine-containing compound represented by Formula 1,

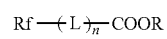 Formula 1 in Formula 1, n is 0 or 1, and when n is 0, Rf represents a perfluoroalkyl group and R represents an unsubstituted alkyl group having one or two carbon atoms, and
when n is 1, Rf represents a fluorine-containing hydrocarbon group, L represents an alkylene group, and R represents a fluorine-containing hydrocarbon group; and
(iii) a fluorine-containing compound represented by Formula 1, $$Rf-(L)_n-COOR \qquad \text{Formula 1}$$

in Formula 1, Rf represents a fluorine-containing hydrocarbon group, L represents a divalent linking group including one or more alkylene groups and one or more ester groups, R represents a hydrogen atom, an unsubstituted alkyl group, or a fluorine-containing hydrocarbon group, and n is 1.

2. The magnetic recording medium according to claim 1, wherein, in clause (ii) when n is 1 and in clause (iii), in Formula 1, Rf represents a perfluoroalkyl group.

3. The magnetic recording medium according to claim 1, wherein the fluorine-containing compound is a compound of clause (ii) in claim 1.

4. The magnetic recording medium according to claim 1, wherein the ratio θr is 0.50 to 0.95.

5. The magnetic recording medium according to any claim 1,
wherein the Ra is 0.1 nm to 1.2 nm.

6. The magnetic recording medium according to claim 1, wherein the Hk is 12 kOe to 50 kOe.

7. The magnetic recording medium according to claim 1, wherein the ferromagnetic powder is a hexagonal ferrite powder.

8. The magnetic recording medium according to claim 7, wherein the hexagonal ferrite powder is a hexagonal strontium ferrite powder.

9. The magnetic recording medium according to claim 7, wherein the hexagonal ferrite powder is a hexagonal barium ferrite powder.

10. The magnetic recording medium according to claim 1, wherein the ferromagnetic powder is an ε-iron oxide powder.

11. The magnetic recording medium according to claim 1, further comprising a non-magnetic layer including a non-magnetic powder between the non-magnetic support and the magnetic layer.

12. The magnetic recording medium according to claim 1, further comprising a back coating layer including a non-magnetic powder on a surface side of the non-magnetic support opposite to a surface side on which the magnetic layer is provided.

13. The magnetic recording medium according to claim 1, wherein the magnetic recording medium is a magnetic tape.

14. A magnetic tape cartridge comprising the magnetic tape according to claim 13.

15. A magnetic recording and reproducing device comprising the magnetic recording medium according to claim 1.

16. The magnetic recording medium according to claim 1, wherein the fluorine-containing compound is a compound of clause (iii) in claim 1.

17. The magnetic recording medium according to claim 3, wherein, in Formula 1, n in clause (ii) is 1.

* * * * *